United States Patent

McNally

[15] 3,677,561

[45] July 18, 1972

[54] ADJUSTABLE SHOCK ABSORBER ASSEMBLIES

[72] Inventor: Sellers B. McNally, Homewood, Ill.

[73] Assignee: Maremont Corporation, Chicago, Ill.

[22] Filed: Jan. 5, 1971

[21] Appl. No.: 104,117

[52] U.S. Cl. .......................... 280/124 F, 267/65
[51] Int. Cl. ................................ B60g 77/04
[58] Field of Search .................. 267/65; 280/124

[56] References Cited

UNITED STATES PATENTS

| | | | |
|---|---|---|---|
| 3,376,032 | 4/1968 | Scmid | 267/65 X |
| 3,331,599 | 7/1967 | Polhemus | 267/34 |
| 2,956,796 | 10/1960 | Devillers | 267/65 R |

Primary Examiner—Philip Goodman
Attorney—Cushman, Darby & Cushman

[57] ABSTRACT

A set of direct, double acting, hydraulic shock absorbers for use in a racing vehicle having front and rear wheels, one pair of shock absorbers being adapted for mounting in the front suspension system and a second pair of shock absorbers for mounting in the rear suspension system; manually adjustable means in the form of a variable flow passage and an adjustable valve are provided for controlling the damping characteristics of each of the shock absorbers of the set so that the shock absorbers may be used on a vehicle under ordinary road conditions and be adjusted to meet the conditions encountered when the vehicle is used in high-speed races.

9 Claims, 14 Drawing Figures

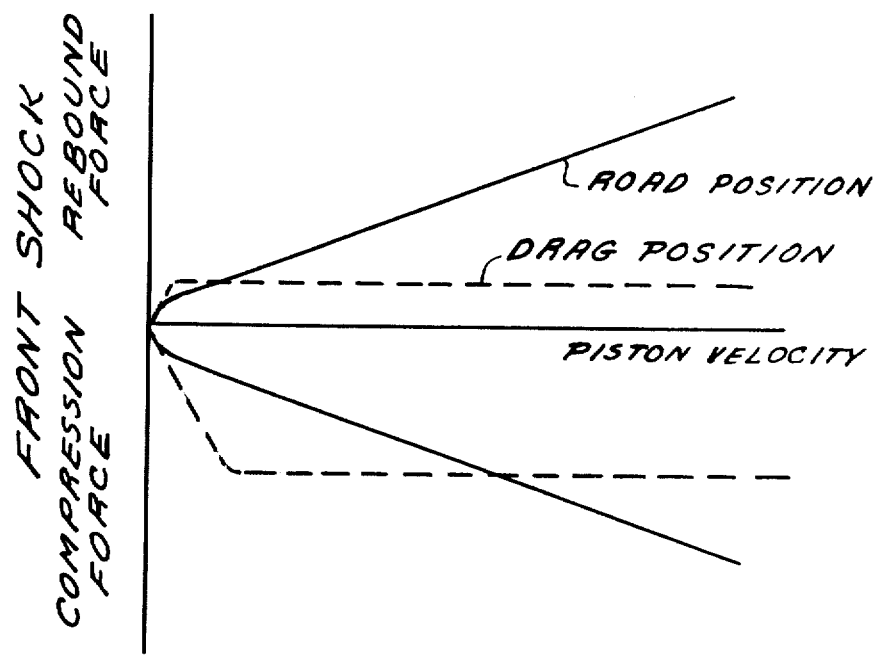
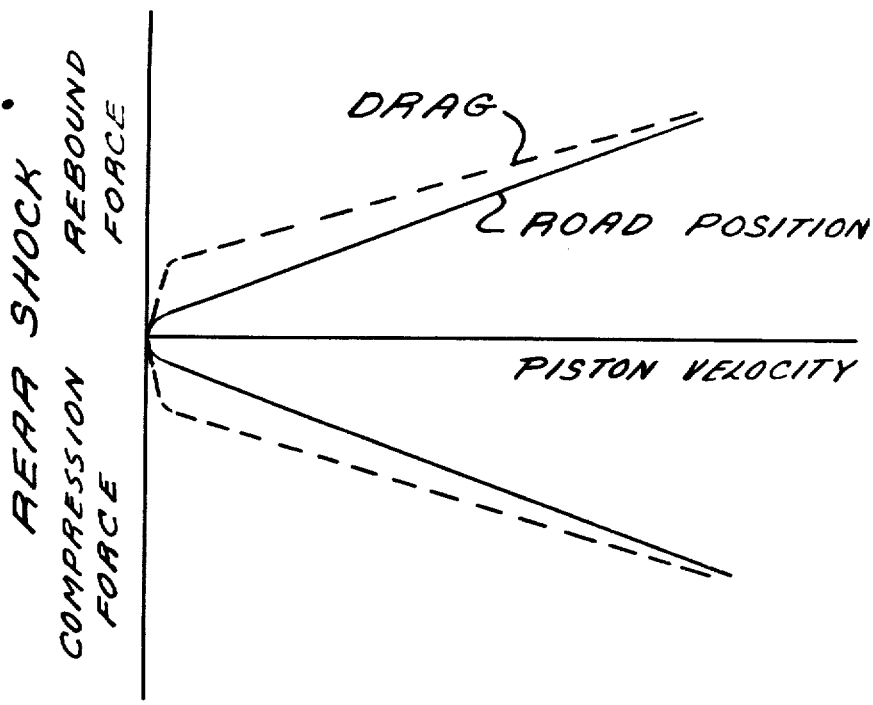

Patented July 18, 1972
3,677,561
3 Sheets-Sheet 2
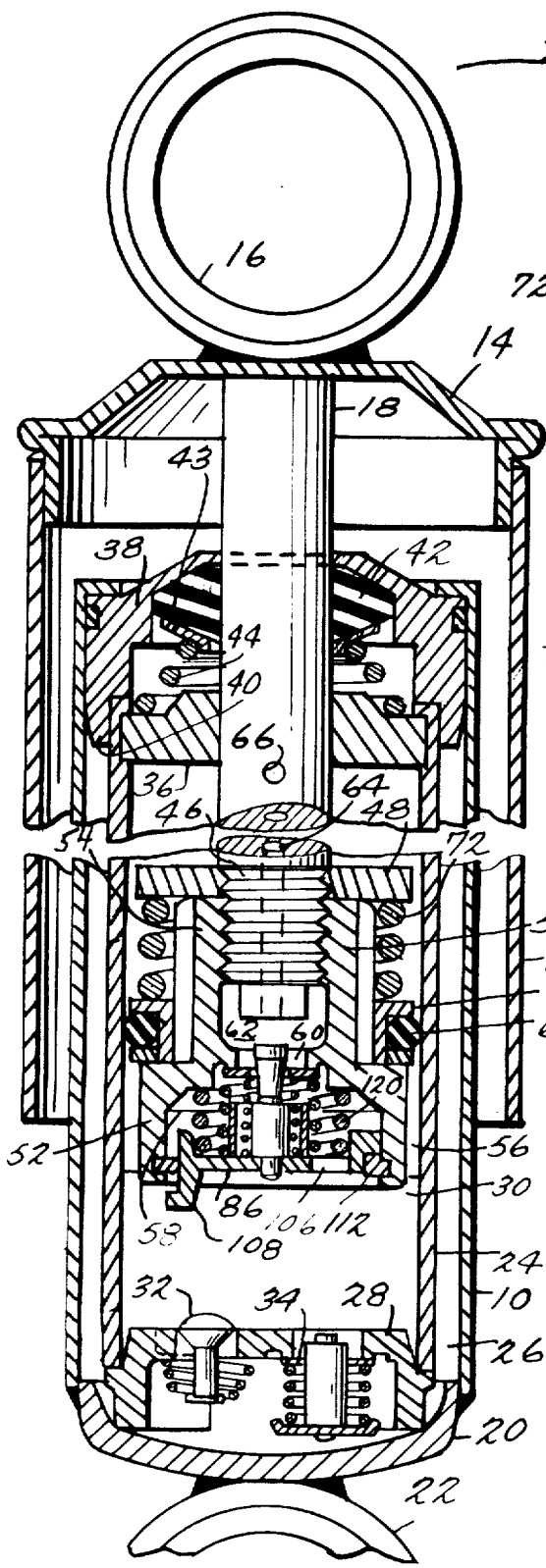
Fig.3.
Fig.5.
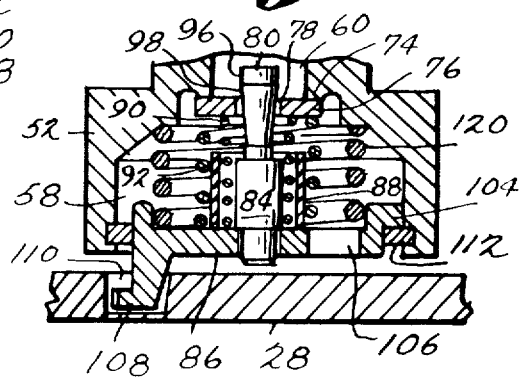
Fig.4.
INVENTOR
SELLERS B. M<sup>c</sup>NALLY
BY Cushman Darby & Cushman
ATTORNEYS

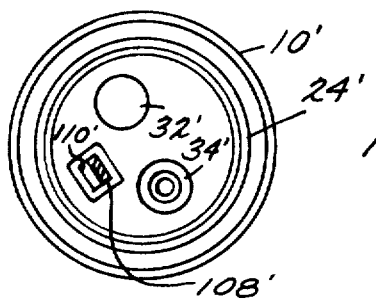
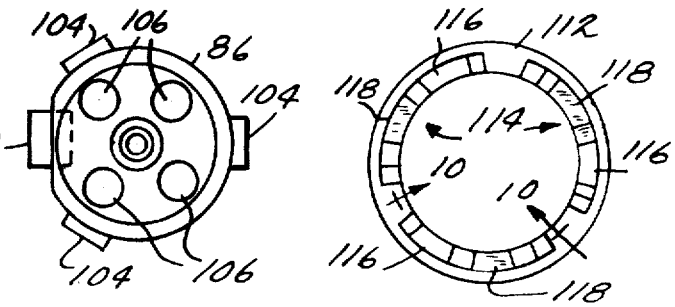
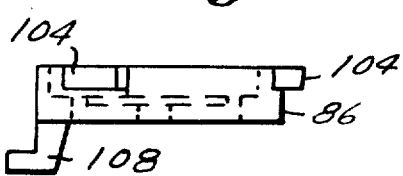
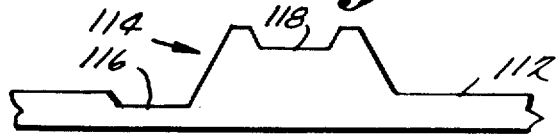
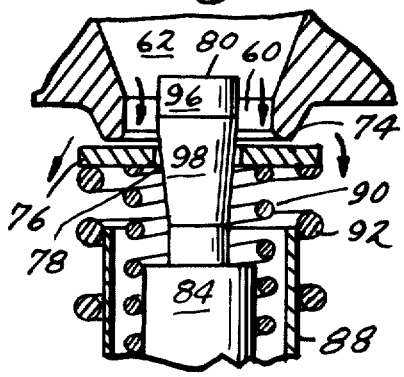
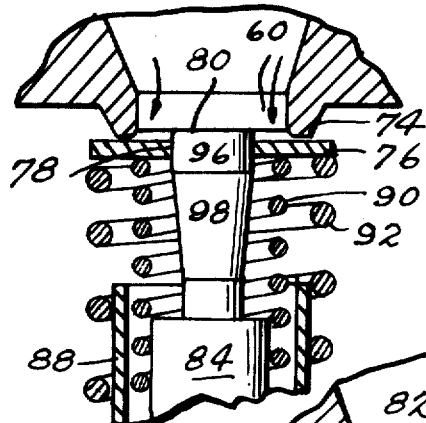
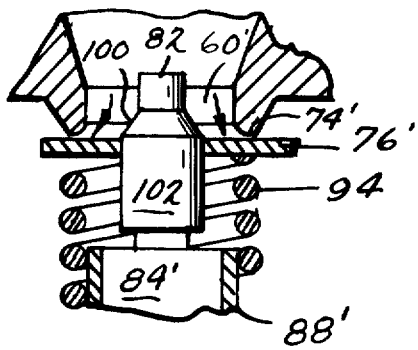
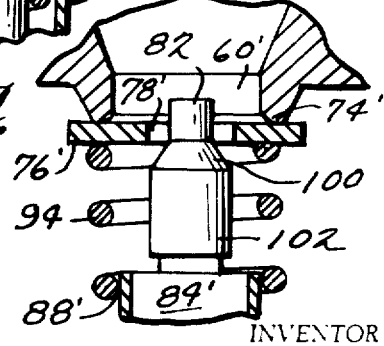
INVENTOR
SELLERS B. MCNALLY
BY Cushman, Darby & Cushman
ATTORNEYS

ADJUSTABLE SHOCK ABSORBER ASSEMBLIES

BACKGROUND OF THE INVENTION

This invention relates to shock absorbers, and more specifically to a set of shock absorbers of the direct, double acting, hydraulic type having control means for altering the damping characteristics of each of the shock absorbers of the set so that one set of shock absorbers may be mounted on a vehicle which is used for ordinary road travel and in high-speed drag races.

Ordinarily, shock absorbers which are mass produced are, for reasons of economy, only structured to perform under ordinary road conditions as opposed to the substantially different conditions encountered in high-speed drag racing. As a consequence, when an individual desired to use his racing vehicle for ordinary road travel, for instance, in going to and from various racing meets, it has been necessary to engage in the time-consuming and laborious task of repeatedly substituting the ordinary road shock absorbers for the high-speed or drag shock absorbers before and after each contest. Moreover, an individual was put to the expense of employing two complete sets of shock absorbers for his vehicle.

It has long been realized that not only do the damping requirements differ significantly when a vehicle is used under ordinary road conditions as opposed to racing conditions but also that the damping requirements are different for the front and rear set of shock absorbers when the vehicle is operated under racing conditions. Standard shock absorbers, therefore, which are manufactured to meet one type of road condition cannot be safely or satisfactorily used to perform under the other condition and shock absorbers that are manufactured with control means for adjusting the damping characteristics to furnish either a "hard" or "soft" ride have not been equipped with control means for discriminating between the damping requirements of front and rear suspensions of a racing vehicle.

Generally, shock absorbers are provided in vehicles to cushion or damp the relative motion between the vehicle body and the vehicle running gear. Direct, double acting, hydraulic shock absorbers when mounted on vehicles usually have their opposite ends connected respectively between the frame and axle of the vehicle. When the vehicle's springs are compressed, as occurs when the wheels of the vehicle strike a roadway elevation, the pistons of the shock absorbers move in their compression stroke, that is downwardly in the cylinders of the shock absorbers. When the vehicle's springs expand, the pistons of the shock absorbers move in their rebound stroke, that is, usually upwardly in the cylinders. Valve means are usually provided in the pistons of such shock absorbers to control the flow of fluid through or around the pistons from one side thereof to the other side during the compression and rebound stroke. Frequently, the valve means of these shock absorbers are spring-loaded and unseat only after a predetermined pressure builds up in the working cylinder which overcomes the spring load. Due to the self-contained structure of fluid type shock absorbers, it has been difficult to provide means for accurately adjusting the spring load acting on the valve without greatly increasing the cost of the shock absorber.

A few shock absorber structures have provided adjustable pin means disposed in a passage of the piston for controlling in combination with a valve the flow of fluid therethrough. The shock absorbers of this type, however, have not been capable of adjustment to accommodate the significant difference in damping requirements between ordinary road travel and racing conditions.

An embodiments of the present invention provides a set of shock absorbers having one pair for mounting in the front suspension system and a second pair for mounting in the rear suspension system of a vehicle wherein each shock absorber of each pair may be accurately adjusted without disassembling the shock absorber for operation under ordinary road conditions or for operation under racing conditions.

SUMMARY OF THE INVENTION

An embodiment of the present invention permits the operator of a motor vehicle to use the same set of shock absorbers in a vehicle suspension system when the vehicle is used for ordinary road travel and for drag strip racing. To this end, the pistons of the direct, double acting hydraulic shock absorbers are provided with valve means that are adjustable for controlling the fluid flow through the piston when the piston moves through its compression stroke and rebound stroke. Generally, the standard shock absorbers that are used for ordinary road travel are set so that the rebound and compression forces that are set up when the piston moves through its rebound and compression strokes are nearly equal so that the resulting damping effect of the shock absorber is approximately uniform for both directions of piston travel resulting in a well-controlled and comfortable vehicle ride.

For drag strip racing, shock absorber damping requirements differ not only from the requirements of ordinary road travel but even between the shock absorbers mounted in the front suspension system and the ones mounted in the rear suspension system. More specifically, when a racing vehicle undergoes rapid acceleration, the forward thrust of the vehicle tends to transfer a greater portion of the vehicle weight to the rear wheels. Accordingly, it is desirable to control the attitude of the vehicle chassis so as to maintain the favorable weight transfer. One manner of effecting such a weight shift is to permit the front shock absorbers to freely extend when the vehicle accelerates, so that the front part of the vehicle will be maintained in a raised position relative to the rear wheels resulting in a shift of weight to the rear wheels of the vehicle. Moreover, for adequate traction and racing performance of the rear wheels of a vehicle, relatively stiff shock absorbers are required to insure sufficient control of the drive wheels and to avoid undesirable and dangerous oscillation of the wheels and/or axle as well as contact of the rear end of the vehicle with the pavement when the car undergoes rapid acceleration.

An embodiment of the present invention provides a set of shock absorbers having one pair for mounting between the front end of the vehicle and the front wheels and a second pair for mounting between the rear end of the vehicle and the rear wheels. Each shock absorber of the set consists of a tubular arrangement having a substantially cylindrical outer casing which is capable of relative telescoping movement with respect to a cylindrical guard that is spaced radially outwardly from the casing. Each end of each shock absorber is provided with conventional means for attaching one end of the shock absorber to the frame of a motor vehicle and the other end to the axle of the appropriate vehicle wheel. A working chamber in the form of a cylinder is disposed within the casing and spaced radially therefrom so as to form a reservoir between the casing and cylinder which communicates through suitable valving with the interior of the working chamber. A piston is slidably disposed in the chamber and is provided with a piston rod which extends through the end wall of the chamber opposite the reservoir valving. The end of the piston rod is suitably connected to the cylindrical guard so that movement of the guard will effect movement of the piston rod and piston. Two fluid passages are provided for permitting flow of hydraulic fluid from one side of the piston to the other. One passage is located around the periphery of the piston between the piston and the working chamber cylinder wall. A bypass valve controls fluid flow through this first passage when the piston moves through its compression stroke. A second passage for fluid flow is formed through the body of the piston and is provided with a valve seat therein. Manually adjustable control means are provided in the second passage for cooperation with the valve seat and passage and are adjustable between two positions whereby the damping characteristics of each shock absorber may be changed to accommodate either ordinary road travel conditions or the conditions encountered when a vehicle is engaged in drag strip racing.

For the front shock absorbers, the control means are adjustable between a first position so that, for road travel, the rebound and compression forces which exist when the piston moves relative to the working cylinder will be nearly uniform, and a second position for racing conditions, wherein the rebound forces will be reduced and the compression forces increased. When the control means are in this second position, upon initial acceleration, the front suspension is permitted to extend to its maximum height and will tend to remain extended due to the existence of the large compression forces in the front pair of shock absorbers.

Adjustable flow control means are also provided in the pistons of the rear shock absorbers for accommodating the performance differences between road travel and racing use. In the first position, fluid flow through the pistons is regulated to produce generally the same damping performance as the front shock absorbers. As previously noted, however, the damping requirements for the rear shock absorbers when the vehicle is used under racing conditions is substantially different from the requirements of the front shock absorbers under the same conditions. More specifically, the control means for the rear shock absorbers, when in the second position, will produce high compression and rebound forces at relatively low velocities of piston travel relative to the working cylinder. As a result, good traction will be obtained between the driving wheels and the pavement when the vehicle rapidly accelerates due to the "stiffness" of the rear shock absorbers.

As generally indicated above, each of the shock absorbers of the present invention consists of a piston slidably disposed in a cylindrical working chamber having an end wall formed with fluid passages leading to a fluid reservoir. The end wall of each shock absorber is provided with a first valve for controlling fluid flow from the chamber to the reservoir when the piston moves through its compression stroke and a second valve for controlling fluid flow from the reservoir to the chamber when the piston moves through its rebound stroke. The piston itself as pointed out above is provided with exterior flow passages formed about its circumference in the wall of the piston. A spring biased valve ring is disposed about the piston and operates to block fluid flow through the passages when the piston moves through its rebound stroke and to permit fluid flow through the passages on the piston's compression stroke travel when the pressure beneath the piston becomes sufficient to overcome the force of the valve spring. The control means for the shock absorbers of the present invention include a passage formed through the body of the piston one end of which is in fluid communication with a passage formed in the piston rod. The passage through the piston rod is provided with a radially disposed port spaced a distance from the top side of the piston for a purpose which will be hereinafter more fully described. The passage in the piston is formed with a valve seat and a spring biased valve member and valve pin are provided for cooperating with the valve seat to control fluid flow through the passage. The valve pin is disposed to extend through an opening in the valve member and the spring force on the valve member as well as the position of the pin with respect to the valve seat and member are manually adjustable between two positions in each of the shock absorbers. Since the shock absorbing performance requirements of the front shock absorbers differ from that of the rear shock absorbers when the vehicle is used for racing, the structure of the flow controlling elements consisting of the valve member, its associated spring and the valve pin are different for each pair of shock absorbers.

Specifically, in the front shock absorbers, the valve pin is provided with at least two portions of differing cross-sectional areas which are arranged so that when the smaller portion is disposed to extend through the valve seat, a relatively higher spring force is exerted on the valve member and a flow clearance is provided between the valve member and valve pin whereas, in the drag racing position, when the larger portion of the valve pin is disposed to lie in a plane approximately coincident with the plane of the valve seat, the spring force acting on the valve member is decreased and the flow clearance is closed. Employment of the foregoing arrangement will result in generally equal rebound and compression forces in the shock absorber when the control elements are in the first, or road travel position, while, when the control elements are in the second or racing position, the compression forces in the shock absorber will be substantially increased and the rebound forces decreased.

In the rear shock absorbers, the valve pin is provided with a different shape from that of the valve pin in the front shock absorbers in view of the difference in damping characteristics required for the rear shock absorbers when the vehicle is engaged in high-speed races. More particularly, the valve pin in the rear shocks is structured so that in the first or road travel position a flow passage will be provided between the valve pin and opening in the valve member and the spring load on the valve member will be relatively less than when the control elements are in the second or racing position. It will be seen that the valve pin for the rear shock absorbers is so structured that, when in the first or road travel position, the compression and rebound forces will be such that the damping characteristics of the rear shock absorbers will be approximately equal to the damping characteristics of the front shock absorbers when the control means of each of the shock absorbers of the set are positioned for ordinary road travel.

Accordingly, an object of the present invention is to provide a set of direct, double acting hydraulic shock absorbers provided with improved means for altering the damping characteristics thereof so that the shock absorbers may be mounted on a vehicle which is used both for ordinary road travel and for high-speed racing.

A further object is to provide manually adjustable control means for altering the damping characteristics of each shock absorber without requiring disassembly of the shock absorber to effect the adjustment thereof.

Another object of this invention is to provide adjustable control means for regulating the damping characteristics of the shock absorbers, which adjustment can be accurately carried out by simply collapsing each shock absorber and relatively rotating the parts thereof.

A still further object is to provide a set of shock absorbers consisting of a pair of shock absorbers for mounting in the front suspension system and a pair for the rear suspension system wherein the damping characteristics of the front pair differ from those of the rear pair when the vehicle is used for drag racing.

BRIEF DESCRIPTION OF THE DRAWINGS

Further additional objects and advantages will become apparent as consideration is given to the following detailed description of a preferred embodiment of the invention as is illustrated in the accompanying drawings forming part of this specification and wherein:

FIGS. 1 and 2 are graphic illustrations of the damping requirements of the front and rear shock absorbers respectively of the present invention;

FIG. 3 is a sectional view in elevation of a direct, double-acting, hydraulic shock absorber for mounting in the front suspension system of a vehicle;

FIG. 4 is an enlarged sectional view of a portion of the fluid control means of the front shock absorbers of the present invention;

FIG. 5 is a fragmentary sectional view illustrating the fluid control means for the rear shock absorbers of the present invention;

FIG. 6 is a transverse sectional view taken substantially on line 6—6 of FIG. 5, looking in the direction of the arrows;

FIG. 7 is a detached plan view of the rebound or recoil valve spring retainer member;

FIG. 8 is a detached plan view of the cam ring which cooperates with the retainer member of FIG. 7 to adjust the position of the latter to very simultaneously the spring load on the rebound or recoil valve and the capacity of the recoil or rebound orifice;

FIG. 9 is a detached elevational view of the rebound or recoil valve spring retainer member;

FIG. 10 is a sectional view taken on line 10—10 of FIG. 8 looking in the direction of the arrows;

FIGS. 11 and 12 are sectional illustrations in elevation of the control means for the front shock absorbers in each of the adjusted positions; and FIGS. 13 and 14 are sectional illustrations of the control means for the rear shock absorbers in each of the adjusted positions.

DETAILED DESCRIPTION OF THE INVENTION

Referring to FIGS. 1 and 2 of the drawings, there is graphically illustrated for the purposes of comparison the damping requirements of a shock absorber when subjected to various road conditions. In FIG. 1, the damping characteristics or requirements of a shock absorber mounted between a frame and front wheels of the vehicle are represented. For standard road performance, it is desirable that the damping forces created when the piston moves relative to the working cylinder be substantially uniform for both the rebound and compression stroke so as to obtain a comfortable vehicle ride. The magnitude of the rebound and compression forces is illustrated relative to the velocity of piston travel relative to the working cylinder chamber with the solid line designating the desired damping characteristics for ordinary road travel and the dashed line designating the damping characteristics desired when a vehicle is used in drag races. It will be seen that the damping forces for drag strip performance should be very small when the piston moves through a rebound stroke and very large when the piston moves through a compression stroke so that the shock absorber will permit the front suspension to extend upon initial acceleration to shift the weight of the vehicle to the rear driving wheels. As will be seen, due to the existence of large compression forces even at low velocities of piston travel, the shock absorbers mounted in the front will tend to keep the suspension system in an extended position.

With reference now to FIG. 2, the damping requirements or characteristics of shock absorbers mounted in the rear of a vehicle when the vehicle is used for ordinary road travel and for drag strip racing are illustrated in the same manner as set forth with reference to FIG. 1. It will be noted that for rear shock absorbers when used on a racing vehicle under racing conditions, it is desirable to have large damping forces for both the rebound and compression strokes of a shock absorber piston particularly at low velocities of piston travel. The existence of large damping forces will provide increased resistance to wheel hop, axle flutter and rear end squat. If such large damping forces existed when a vehicle was used for ordinary road travel, an extremely harsh vehicle ride would result at low velocities of piston travel.

In the preferred embodiment of the present invention, a set of shock absorbers is provided having a pair for the front suspension system and a pair for the rear suspension system wherein each shock absorber of each pair is provided with control means which are simply and accurately adjustable between two positions. When in one position, the damping characteristics of each shock absorber of the set will be appropriate for ordinary road travel as set forth above. The control means of the shock absorbers of the front pair when changed to the second position will function to provide the damping characteristics required when the vehicle is used in drag strip racing. Similarly, when the control means of the rear pair of shock absorbers are adjusted to the second position, these shock absorbers will furnish the damping characteristics required for racing condition which, as noted previously, are different from the characteristics of the front shock absorbers when adjusted for racing conditions.

Referring now to FIG. 3 of the drawings, there is illustrated a shock absorber for the front suspension system of the direct, double-acting hydraulic type comprising a substantially cylindrical outer casing 10 which is capable of relative telescopic movement within a cylindrical guard or shield 12 that is spaced radially outwardly from the casing 10. The upper end of the guard shield 12 is closed by an inverted cup-shaped closure or cap member 14 which is secured thereto with a screw threaded connection. It will be understood, of course, that the cap member 14 may be secured by welding, soldering or other conventional means. The cap member 14 has an eye 16 fixed exteriorly thereto, and a piston rod 18 is rigidly connected to the cap member 14 and eye 16. The lower end of the casing 10 is closed by a cup-shaped closure member 20 which has secured to its outer side a lower eye 22. The closure member 20 may be secured to the casing 10 by any suitable means such as welding.

A pressure or working cylinder 24 is disposed within the casing 10 in spaced concentric relationship therewith so that the space defined by the casing 10, wall of cylinder 24, closure member 20 and a closure member for the upper end of the casing and cylinder, later to be referred to, constitutes a reservoir 26 for the hydraulic fluid in the shock absorber.

The lower end of the working cylinder 24 is connected to an inverted cup-shaped closure and valve cage member which forms an end wall 28 for the working chamber 30 formed by working cylinder 24. End wall 28 is also connected to the closure member 20. The end wall 28 carries a replenishing valve means 32 and an impact valve means 34. It will be realized that during the impact or downward stroke of the piston of the shock absorber, fluid will flow from the working chamber 30 through the impact valve assembly 34 when a predetermined fluid pressure occurs and thence through passages between the end wall 28 and the closure member 20 and into the reservoir 26. During the rebound or recoil or upward stroke of the piston with respect to the end wall 28, the replenishing valve 32 unseats and fluid flows from the reservoir 26 through the replenishing valve assembly and into the working chamber 24 below the upwardly moving piston.

The upper or high pressure end of the working chamber 30 is closed by a plug member 36 having a centrally disposed opening therethrough for slidably receiving the piston rod 18. The upper end of the casing 10 is closed by a closure member 38 which is suitably secured to the casing 10. Member 38 is provided with inwardly extending portions 40 that contact with the upper end of the cylinder 24. The member 38 is also provided with a centrally disposed recess in which is arranged a double conical piston rod packing 42 through which the piston rod extends and passes outwardly of the member 38 by means of the central opening provided in the latter. The piston packing 42 is held under compression by a coil spring 44 acting on a washer 43 in contact with the tapered inner end of the packing and also abutting the plug member 36. The angle with which the spring force urges the washer 43 against the packing 42 is such that the washer makes contact first with the lower inner surface of the packing.

The piston rod 18 has its lower end threaded, as indicated at 46, and screwed on this threaded end 46 of the piston rod is a spring abutment plate 48 as well as the piston 50 which includes a lower, enlarged portion 52 of a diameter such as to slidably interfit the working cylinder 24. The piston 50 further includes an upper portion 54 of a reduced diameter. The periphery of the lower portion 52 is provided with a plurality of circularly spaced axially extending grooves or passages 56 which communicate with the space below the piston and the annular space between the upper portion 54 and the interior wall of working cylinder 24.

The lower portion 52 of the piston 50 is provided with a counterbore or chamber 58 and its upper end communicates with a passage 60 formed centrally of the piston at the junction of the lower portion 52 and the reduced upper portion 54 thereof. The reduced upper portion 54 of the piston is provided with a central bore or passage 62 of larger diameter than the bore 60 but coaxial therewith. The upper portion of the bore 62 is threaded so that the piston can be screwed onto the threaded lower end 46 of the piston rod 18 until the upper end of the portion 54 of the piston engages the spring abutment plate 48. A fluid passage 64 is provided in the lower end of piston rod 18 for establishing fluid communication between bore 62 and the space in working chamber 30 above the piston 50 by means of a radial port 66 which is spaced a distance along the piston rod 18 from piston 50 as shown in FIG. 5. With this arrangement, when the piston moves through its rebound stroke, a fluid cushion will be provided when port 66 passes out of the working chamber 30 thereby cutting off the fluid passage.

A flexible packing and valve ring 68 of normally circular cross-section and formed of any suitable material, such as natural or synthetic rubber for example, is mounted on a carrier 70 which is slidable on the upper portion 54 of the piston. The carrier 70 is in the form of a ring of angle cross-section and its axially extending flange slides on the portion 54 of the piston, while its radially extending flanges contact the packing and valve ring 68. A coil spring 72 surrounds the portion 54 of the piston and has one of its ends abutting the plate 48 and its opposite end the radially extending flange of the carrier 70 thereby functioning to maintain the carrier 70 and the packing and valve ring 68 in the position shown in FIG. 3, wherein the carrier is abutting the larger or lower portion 52 of the piston, while the ring 68 acts as a valve sealing the flow of fluid from the underside of the piston through the passages 56 to the upper side of the piston. It will be understood that during the compression or downward stroke of the piston, occasioned by the compression of the vehicle spring, as soon as the fluid pressure below the piston overcomes the load of the spring 72, the ring 68 and the carrier 70 will move upwardly on the portion 54 of the piston and away from the portion 52 to allow the flow of fluid upwardly through the passages 56. The ring 68 constitutes the piston impact valve in that it controls the flow of fluid from the lower side of the piston to the upper side thereof during the compression stroke of the piston in the working chamber 30.

It should be understood that the description as thusfar set forth is fully applicable to the rear pair of shock absorbers, since the shock absorbers of the set differ structurally only with respect to the elements so designated hereinafter.

Turning now to a description of the flow controlling elements, the piston at the lower end of the bore 60 and within the chamber 58 is provided with a valve seat 74 for a valve disc 76 as is more clearly shown in FIG. 4. The primed numerals designate corresponding elements of the rear pair of shock absorbers, one of which is shown in FIG. 5. The valve disc 76, 76' constitutes the piston recoil or rebound valve that controls the flow of fluid through the piston during the recoil or rebound stroke during which the piston moves away from the end wall 28. In each of the shock absorbers of the set of the present invention, the valve disc 76, 76' is provided with a central opening 78, 78' through which extends a valve pin designated as 80 for the front shock absorbers, as illustrated in FIG. 4, and at 82 in FIG. 5 for the rear shock absorbers. The valve disc 76, 76' is movable on each valve pin, as will later be explained. Each valve pin of the set has an enlarged cylindrical portion 84, 84' adjacent its lower end and each pin at its lower end is rigidly connected to a valve spring retainer member 86, 86'. A sleeve 88' in the rear shock absorbers surrounds the enlarged portion 84' of valve pin 84' while sleeve 88 is of slightly larger diameter than portion 84. For the front shock absorbers, two coil springs 90 and 92 are concentrically disposed about valve pin 80 each having one end engaging the valve spring retainer member 86. The inner coil spring 90 has a lower spring constant and a greater longitudinal dimension relative to the outer coil spring 92 so that, as will be explained later, inner coil spring 90 always has its end opposite retainer member 86 engaging the underside of valve disc 76 to urge the valve disc into seating contact with the valve seat 74. In the rear shock absorbers, a single rebound valve spring in the form of a coil spring 94 surrounds the sleeve 88' and has one end in contact with the spring retainer member 86' and its other end always in contact with valve disc 76' to urge same into seating contact with the valve seat 74'.

Sleeves 88 and 88' are formed to have exterior diameters such that a slight radial force will be applied to the inside surfaces of springs 92 and 94 respectively to damp the oscillations of these springs.

Referring again to FIG. 4, the valve pin 80, at its upper or free end, has a cylindrical portion 96 of substantially the same diameter as the diameter of the central opening 78 of the valve disc 76, and a frustoconical neck portion 98 which tapers inwardly from the cylindrical portion 96 toward the lower cylindrical portion 84. As a result, the diameter of the neck portion decreases and is less than the diameter of the opening 78 at every point along its longitudinal extent. It will be understood, therefore, that when portion 96 is positioned within the opening 78 on the valve disc, fluid flow through the opening will be prevented and, when the valve pin 80 is positioned as illustrated in FIG. 4, a clearance will be provided between the valve pin neck portion 98 and the edge of the opening 78 to permit fluid flow therebetween.

Referring now to the valve pin 82 for the rear shock absorbers illustrated in FIG. 5, it will be seen that the upper free end thereof has a cylindrical portion and a frustoconical portion 100 which tapers outwardly from a diameter substantially less than that of the opening 78' to a diameter substantially equal to that of the opening 78' at the cylindrical portion 102 so that when the portion 100 is positioned in the opening 78' of the valve disc 76', a clearance will exist to permit fluid flow therebetween while, when the lower portion 102 is positioned in the opening 78', fluid flow will be prevented.

The means for changing the position of the respective valve pins with respect to the valve seats and valve discs which are a slight modification of the arrangement disclosed in the Whisler U.S. Pat. No. 2,788,092, will now be described with reference to FIGS. 5-10 inclusive, and it will be understood that the description applies to both the front and rear shock absorbers.

Each of the valve spring retainer members 86, 86' of each of the shock absorbers of the set is dish-shaped and is provided adjacent its upper circumferential edge with exteriorly extending, equally circularly spaced lugs 104, 104'. As previously noted, each of the valve pins 80 and 82 is rigidly secured centrally to the bottom wall of the dish-shaped retainer members 86, 86' and said bottom wall, outwardly of its center is provided with a plurality of openings 106. Depending from the underside of retainer member 86 is a lug element 108, 108', the free end of which is adapted to fit into the socket 110, 110' formed in end wall 28.

With particular reference to FIGS. 8 and 10, there is shown a cam ring 112 which is provided with an annular flange that is clamped into an annular groove formed in the wall of chamber 58 in such a manner that the cam ring 112 is rigidly and fixedly secured in the lower end of the chamber. On the side of the cam ring that faces inwardly of the chamber 58 there is provided there identically formed and equally circularly spaced cam surface portions indicated generally at 114. In FIG. 10, there is shown a greatly enlarged elevational view taken along lines 10—10 of FIG. 8 of one of the cam surface portions 114 showing the relative disposition of lug 104 engaging surfaces 116 and 118, surface 116 being spaced below surface 118. When the cam ring 112 is secured in the piston chamber 58, the valve spring retainer member 86 will be supported thereby with the lugs 104 of the latter in engagement with either the respective surfaces 116 or 118. A retaining spring 120 engaging the bottom of the retainer member 86 and the inner end of the chamber 58 in the piston maintains the lugs 104 in engagement with the surfaces 116 or 118 of the cam ring 112.

When it is desired to change the position of the valve spring retainer member 86 with respect to the chamber 58, the shock absorber is collapsed by moving the piston toward the member 28 until the depending lug 108 engages and bottoms in the socket 110 formed in the end wall 28 whereupon the retainer member 86 is raised inwardly of the chamber 58 to slightly compress the spring (or springs in the front shock absorbers) in engagement therewith and to raise the lugs 104 off of the respective cam surfaces of the cam ring 112. Relative rotation between the piston 50 and the end wall 28 will change the position of the lugs 104 of the retainer member 86 from the high position 118 to the low position 116 or vice versa as the case may be. The inclined surfaces adjacent each of the level surfaces 116 and 118 will assure that the lugs 104 will be securely maintained in engagement therewith by virtue of the force of the spring 120.

Referring now to FIGS. 11 and 12, there is illustrated the disposition of the valve pin 80 and springs 90 and 92 of the front pair of shock absorbers of the set in each of the respective flow controlling positions. In FIG. 11, lugs 104 of retainer member 86 are engaging the low surface 116 of the cam ring 112 so that the cylindrical portion 96 of valve pin 80 completely occupies opening 78 in valve disc 76 and the only spring force acting on valve disc 76 is due to engagement with the inner spring 90. It will be understood that when the valve pin 80 and springs 90 and 92 are dispose d as shown in FIG. 11, the shock absorber damping characteristics will be appropriate to meet drag strip racing conditions whereas in FIG. 12 the elements are disposed for ordinary road travel. With the elements arranged as in FIG. 11, when the piston moves through its rebound stroke, pressure will build up above the valve disc 76 until the force of spring 90 is overcome and valve disc 76 moves downwardly along cylindrical portion 96. Since spring 90 is relatively less compressed, there will be less resistance to flow resulting in a desired decreased rebound force relative to the rebound force obtained with the arrangement in FIG. 12. When the piston moves through its compression stroke, however, fluid flow through passage 60 will be prevented so that large compression forces will be built up under the piston until the force of spring 72 (FIG. 3) is overcome.

With the elements arranged as in FIG. 12, when the piston moves through its rebound stroke, relatively larger pressure forces will be required to unseat valve disc 76 since both springs 90 and 92 are acting on the underside of the valve disc. At low velocities of piston travel, however, fluid can flow through the clearance between conical portion 98 of pin 80 and the aperture 78 of the valve disc. When the piston moves through its compression stroke, the compression forces are relatively less than when the pin is in its drag position since fluid may also flow through the clearance between the pin and valve aperture.

Turning now to FIGS. 13 and 14, there are shown the fluid flow controlling elements for the rear pair of shock absorbers in the racing position and ordinary road travel position respectively. It should be noted that pin 82 of the rear shock absorbers is moved upwardly into passage 60' corresponding to the engagement of lugs 104' with the high surface of the cam ring when damping characteristics for racing conditions are desired, whereas for the front shock absorbers, for racing conditions, lugs 104 engage surface 116 and valve pin 80 of the front pair of the shock absorbers is moved out of passage 60. In FIG. 13, the valve pin 82 is in its racing position wherein cylindrical portion 102 completely occupies the aperture in disc 76' and the spring load on valve disc 76' is increased due to the compression of spring 94. With this arrangement, both large rebound and compression forces will be created when the piston moves through its compression and rebound strokes resulting in a relatively stiff shock absorber performance. In FIG. 14, valve pin 82 is positioned for ordinary road travel corresponding to the engagement of lugs 104' with surfaces 116 of cam ring 112. In this position valve pin 82 is moved out of engagement with opening 78' resulting in a clearance between the valve pin and the valve disc so that fluid may flow therebetween for both the compression and rebound strokes of the piston. It should also be pointed out that in FIG. 14 the spring 94 is relatively less compressed than FIG. 13 so that the rebound forces required to unseat valve disc 76' are also lessened. Since the manner in which shock absorbers function is well-known in the art, a more detailed description need not be set forth here.

The foregoing specific embodiments have been described for the purpose of illustrating the principles of the present invention, and the same is subject to modification without departure therefrom. Therefore, the invention includes all modifications encompassed within the spirit and scope of the appended claims.

What is claimed is:

1. In a suspension system for a vehicle having a sprung mass and an unsprung mass, the unsprung mass including the front and rear wheels, a first pair of direct-acting, hydraulic shock absorbers adapted to be connected between the sprung mass and the front wheels and a second pair of direct-acting, hydraulic shock absorbers adapted to be connected between the sprung mass and the rear wheels, each of said shock absorbers comprising a tubular structure defining a cylindrical chamber and a fluid reservoir, said chamber having an end wall and a piston slidable therein toward said end wall in a compression stroke and away from said end wall in a rebound stroke, a piston rod extending from one side of said piston away from said end wall and outwardly of said chamber, means at the end of said chamber opposite said end wall for closing said opposite end and forming a fluid-tight seal about the portion of said piston rod extending therethrough, said chamber having means for controlling fluid flow between said chamber and said reservoir and said piston having means for controllably restricting fluid flow in said chamber so that, when said piston moves through a compression stroke, fluid will flow from the other side of said piston to said one side and from said chamber to said reservoir, and when said piston moves through a rebound stroke, fluid will flow from said one side of said piston to said other side and from said reservoir to said chamber, said flow restricting means including means defining a fluid passage through said piston, a valve seat formed in said passage and pressure actuated control means carried by said piston for cooperating with said valve seat to control fluid flow through said passage, said control means of said first pair of shock absorbers being selectively adjustable with respect to said valve seat between a first position wherein the resistance to fluid flow through said passage when said piston moves through a compression stroke, is approximately equal to the resistance to flow therethrough when said piston moves through s rebound stroke, and a second position wherein fluid flow through said passage, when said piston moves through a compression stroke, is substantially prevented and, when said piston moves through a rebound stroke, the resistance to fluid flow is decreased relative to the resistance to flow therethrough when said control means are in said first position;

said control means of said second pair of shock absorbers being selectively adjustable with respect to said valve seat between a first position wherein the resistance to fluid flow through said passage where said piston moves through a compression stroke is approximately equal to the resistance to flow therethrough when said piston moves through a rebound stroke, and a second position wherein fluid flow through said passage, when said piston moves through a compression stroke is substantially prevented and, when said piston moves through a rebound stroke, the resistance to fluid flow is increased relative to the resistance to flow therethrough when said control means are in said first position.

2. The direct acting, hydraulic shock absorbers as claimed in claim 1, wherein said tubular structure includes a pair of substantially concentric tubular members, one member being disposed radially interiorly of the other, said one member defining said cylindrical chamber and said other member cooperating with said one member to define said fluid reservoir, and means are provided for closing the opposite ends of said other member, said means for closing the end through which said piston rod extends including a closure cap for sealingly engaging the wall of said other member and a portion of the wall of said one member, said closure cap having a central recess for receiving a packing ring for forming a fluid-tight seal about the portion of said piston rod extending therethrough.

3. The direct acting, hydraulic shock absorbers as claimed in claim 1 wherein said end wall of said cylindrical chamber carries said means for controlling fluid flow between said chamber and said reservoir, said flow controlling means including a first fluid passage through said end wall and first valve means for controlling flow through said first passage from said chamber to said reservoir when said piston moves through a compression stroke and second fluid passage through said end wall and second valve means for controlling flow through said second passage from said reservoir to said chamber when said piston moves through a rebound stroke.

4. The direct acting, hydraulic shock absorbers as claimed in claim 1 wherein said means for controllably restricting fluid flow further includes a plurality of grooves formed in the exterior peripheral wall of said piston and valve means carried by said piston for cooperation with said grooves so that when said piston moves through a compression stroke at a predetermined velocity fluid will flow from said other side of said piston to said one side through said grooves and when said piston moves through a rebound stroke, fluid flow through said grooves will be prevented.

5. The direct acting, hydraulic shock absorbers as claimed in claim 1 wherein said piston rod is formed with a fluid passage therein and a radial port is provided in said piston rod at one end of said passage spaced from said piston, the other end of said piston rod passage communicating with said fluid passage in said piston.

6. The direct acting, hydraulic shock absorbers as claimed in claim 1 wherein said pressure actuated control means carried by said piston comprises a cam ring fixed in said passage adjacent said other side of said piston, a retainer member rotatably disposed in said passage and having a surface for cooperation with said cam ring, spring means for maintaining said retainer member in contact with said cam ring, said retainer member and said end wall of said chamber being provided with means interengageable when said piston is moved adjacent to said end wall, said retainer member having a valve pin fixed thereto and extending longitudinally of said passage, a valve movable on said pin toward and from said valve seat, spring means carried by said retainer member for urging said valve into engagement with said valve seat, the end portion of said valve pin remote from said retainer member having portions of differing diameters and said valve having an opening through which said end of valve pin extends so that relative rotation between said piston and end wall when said means are interengaged will effect relative rotation between said retainer member and cam ring to adjust said retainer member inwardly or outwardly of said passage between said first and second positions to increase or decrease the spring load on said valve and to adjust said valve pin with respect to said valve seat between said first and second positions and thereby regulate the clearance between said opening in said valve and said valve pin.

7. The direct acting, hydraulic shock absorbers as claimed in claim 6 wherein said valve pin of said first pair of shock absorbers is formed at its end remote from said retainer member with a cylindrical head portion and a conical neck portion tapering inwardly from said head portion toward said retainer member, said opening in said valve having a diameter such that when said valve pin is in said first position, said neck portion will be disposed therein and a flow passage will be provided between the opening in said valve and said neck portion of said valve pin and, when said valve pin is in said second position, said head portion of said pin will be disposed in said opening so that fluid flow therebetween will be prevented.

8. The direct acting, hydraulic shock absorbers as claimed in claim 7 wherein, in said first pair of shock absorbers, said spring means carried by said retainer member for urging said valve into engagement with said valve seat comprises first and second coil springs disposed generally concentrically of said valve pin, said first spring having a larger diameter than said second spring and a smaller longitudinal dimension so that, when said retainer member is in said second position, said second spring will be in contact with said valve to urge said valve into engagement with said valve seat and said first spring will be out of contact with said valve and, when said retainer member is in said first position, both of said springs will be in contact with said valve thereby increasing the spring load on said valve.

9. The direct acting, hydraulic shock absorbers as claimed in claim 6, wherein said valve pin of said second pair of shock absorbers is formed at its end remote from said retainer member with a cylindrical head portion and a conical neck portion tapering outwardly from said head portion to a diameter substantially equal to the diameter of the opening in said valve, the diameter of said head portion being less than the diameter of said opening so that, when said valve pin is in said first position, a flow passage will be provided between said valve opening and said valve pin and, when said valve pin is in said second position, fluid flow therebetween will be prevented.

* * * * *